No. 874,205. PATENTED DEC. 17, 1907.
J. J. JONES.
FERTILIZER DISTRIBUTER.
APPLICATION FILED JULY 30, 1907.
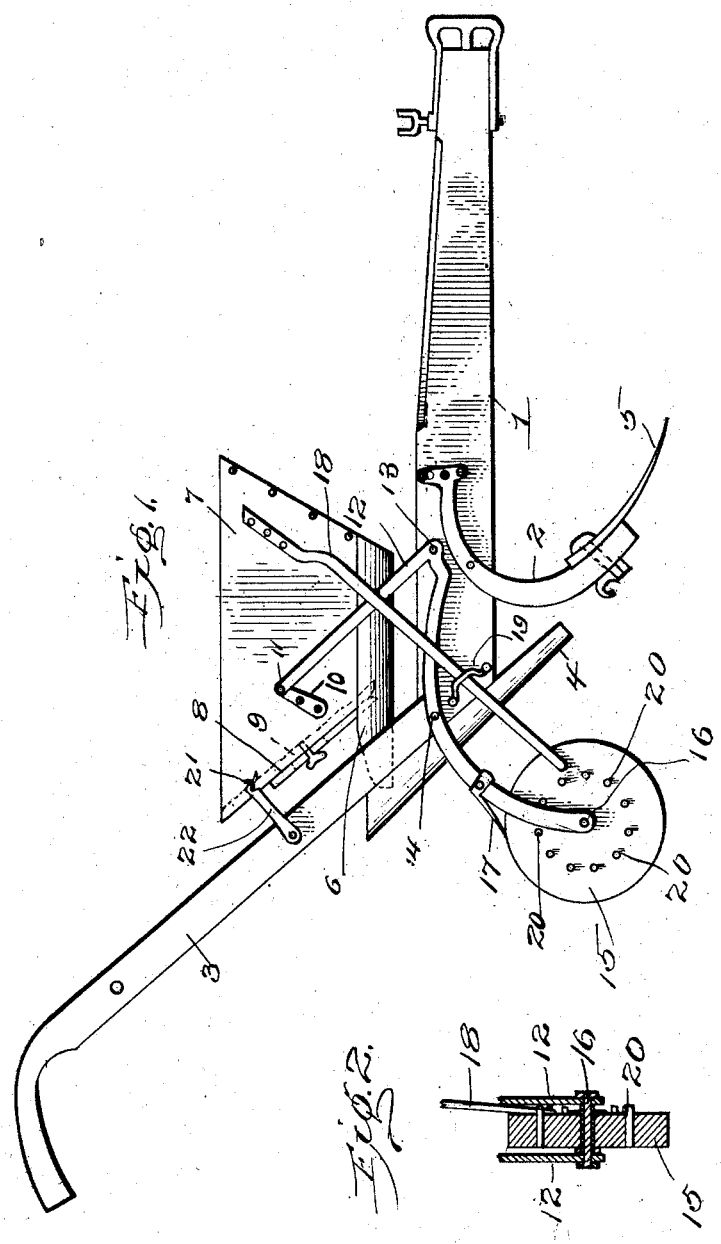
Witnesses
J. M. Fowler Jr.
Edgar Kitchin
Inventor
John Jackson Jones.
By Mason Fenwick & Lawrence,
his Attorneys

UNITED STATES PATENT OFFICE.

JOHN JACKSON JONES, OF MONTICELLO, GEORGIA.

FERTILIZER-DISTRIBUTER.

No. 874,205.  Specification of Letters Patent.  Patented Dec. 17, 1907.

Application filed July 30, 1907. Serial No. 386,222.

*To all whom it may concern:*

Be it known that I, JOHN JACKSON JONES, a citizen of the United States, residing at Monticello, in the county of Jasper and State of Georgia, have invented certain new and useful Improvements in Fertilizer-Distributers; and I do hereby declare the following to be a full, clear, and exact description of the invention, such as will enable others skilled in the art to which it appertains to make and use the same.

This invention relates to improvements in fertilizer distributers, and more particularly to a fertilizer distributing attachment for an ordinary plow stock.

Among the objects in view are the combining of lightness with strength and durability of the parts and the simplifying of construction and facilitating control of operation.

With these and other objects in view, the invention comprises certain novel constructions, combinations and arrangements of parts as will be hereinafter fully described and claimed.

In the accompanying drawing:—Figure 1 is a view in side elevation of fertilizer distributer embodying the features of the present invention. Fig. 2 is a fragmentary, detail sectional view of the operating wheel and connected parts.

Referring to the drawing by numerals, 1 indicates an ordinary plow beam, 2 the standards thereof and 3 the handles connected thereto, said three elements constituting an ordinary plow stock. At the rear end of the beam 1 is disposed a discharge chute 4 which discharges in the rear of the shovel 5 carried by the lower end of the standard 2. The upper end of the chute 5 is arranged to receive the discharge from the trough 6 fixed to the fertilizer containing hopper 7. The hopper 7 has its rear edge cut away for a sufficient distance for permitting the discharge of fertilizer along the trough 6, and the quantity of fertilizer delivered along said trough is governed by an adjustably mounted plate 8 retained in position by set screw 9.

Fixed to the opposite sides of the hopper 7 are plates 10 each provided with a bearing 11 in which is journaled the upper end of a supporting standard or arm 12. Each of the standards or arms 12 extends down to the beam 1 and is secured thereto by a bolt 13 and is then bent rearwardly and again secured by bolt 14 to the said beam or to the lower end of the handles 3. The rearwardly extending portions of the standards 12 extend downwardly and are spaced apart for receiving therebetween an operating wheel 15, said wheel being carried by an axle 16 sustained by the lower ends of the rearwardly extending portions of the standards 12. A suitable scraper 17 is connected with the rear ends of the standards 12 in position for engaging the wheel 15 for scraping the same.

Fixed to one side of the hopper 7 is a vibrator arm 18 which extends downwardly from the hopper in an inclined plane, passing through a guiding loop 19 fixed to the beam 1, and extending contiguous to one side of the wheel 15. Pins 20, 20 extend through the wheel 15 and project beyond one side thereof. The several pins 20 are arranged in a circle and spaced apart, and the lower end of the vibrating arm 18 projects into the path of movement of the several pins 20 so that said arm is struck by each of the pins as the wheel 15 revolves, and the hopper 7 is thereby vibrated upon its pivots 11 whenever the wheel 15 is revolved. Thus in operation as the machine is drawn across the field the engagement of the wheel 15 with the ground produces a continuous vibration of the hopper 7 and thus causes an even, constant flow of fertilizer from the trough 6. When however it is desired to take the machine from the field or otherwise to stop the distribution of fertilizer, the hopper 7 is locked against vibration. To accomplish this locking operation, I preferably provide at each side of the hopper a staple 21 designed to be engaged by the hook 22 pivotally carried by the respective handle 3.

It is to be observed that the pivots 11 are disposed considerably to the rear of the center of gravitation of the hopper 7, and that the vibrating arm is disposed at the opposite end of the hopper so that, as each of the pins 20 passes the said arm and depress the lower end of the same in passing, the front portion of the hopper 7 will be elevated and after the said pin has passed the arm, the front portion of the hopper will drop suddenly back again and bring the vibrating arm into engagement with the next pin 20.

What I claim is:—

1. In a fertilizer distributer, the combination with a plow stock, of a hopper spaced above the same, standards pivotally supporting said hopper, each of said standards being connected to the said stock and being bent rearwardly from the point of connection and being connected a second time to the stock, and being bent rearwardly and downwardly, a wheel rotatably carried between the rear ends of said standards, pins projecting from said wheel, and a spring arm carried by said hopper and permanently projecting into the path of movement of said pins.

2. In a fertilizer distributer, the combination with a plow stock, of a hopper pivotally carried thereby, delivery chutes for said hopper, a wheel rotatably connected with said stock, a guiding loop fixed to said stock, pins projecting laterally from said wheel, and an arm fixed to said hopper and permanently extending through said guiding loop and to a position in the path of movement of said pins.

3. In a fertilizer distributer, the combination with a plow stock, of a hopper pivotally carried thereby, a spring arm secured to the hopper means for vibrating said arm, and a hook pivotally connected with said stock and adapted to engage the hopper for retaining the same against vibration.

4. In a device of the class described, a plow stock, a hopper arranged above the same, a wheel, and a frame supporting the hopper and wheel, said frame consisting of substantially horizontal portions serving as braces for the stock, a downwardly projecting member integral with each of said horizontal portions and provided with bearings for the wheel, and an upwardly extending member also formed integrally with each of said horizontal members and projecting therefrom at an acute angle, said upwardly extending members supporting the hopper and distributing the weight of the material therein between the stock and the wheel.

In testimony whereof I affix my signature in presence of two witnesses.

JOHN JACKSON JONES.

Witnesses:
E. H. JORDAN,
D. N. HARVEY.